May 22, 1928.
A. RASMUSSEN
MECHANICAL MOVEMENT
Filed Sept. 16, 1926
1,670,903
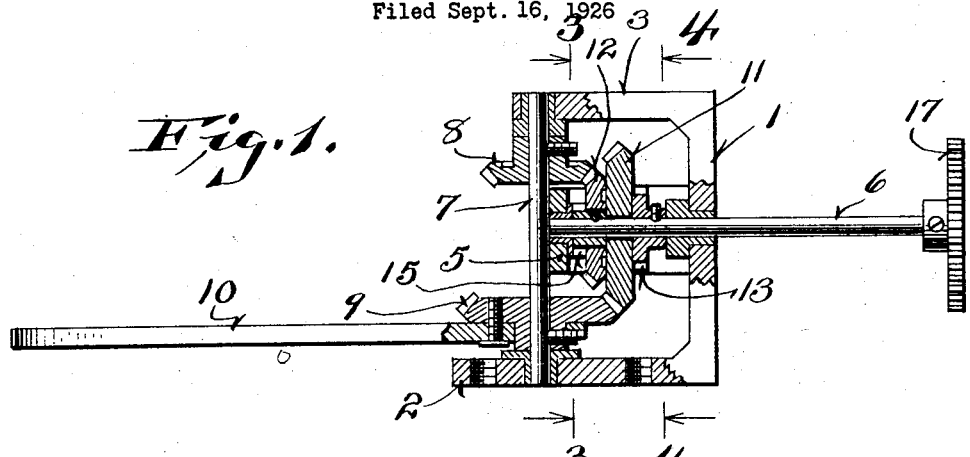
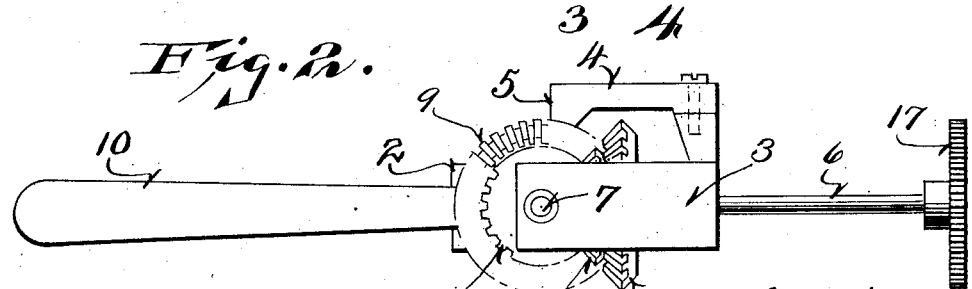
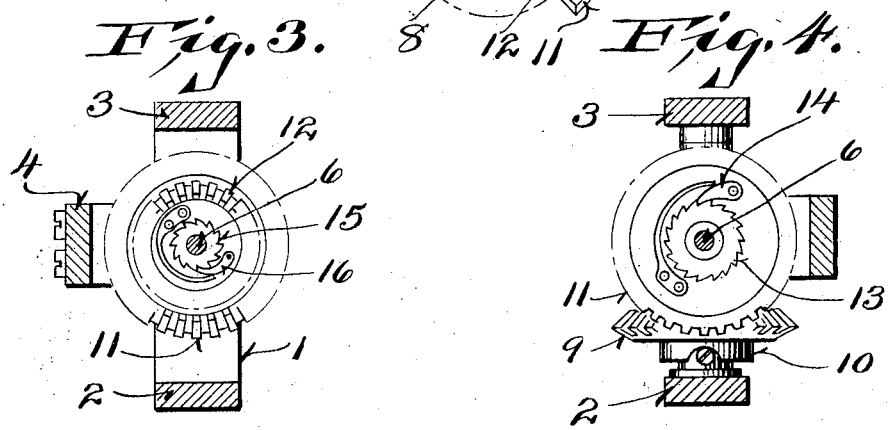
Inventor
Aage Rasmussen Patented May 22, 1928.

1,670,903

UNITED STATES PATENT OFFICE.

AAGE RASMUSSEN, OF MILWAUKEE, WISCONSIN, ASSIGNOR OF FORTY-FIVE ONE-HUNDREDTHS TO FRED W. DICKSON, OF MILWAUKEE, WISCONSIN.

MECHANICAL MOVEMENT.

Application filed September 16, 1926. Serial No. 135,814.

This invention relates to a mechanical movement.

The primary object of this invention is to provide a novel form of mechanical movement which will convert oscillatory motion in either direction into uni-directional rotary motion.

Although this invention may be applied to a large number of different uses, it has been found eminently suitable for winding phonograph motors and will be so described in this application. It is to be distinctly understood, however, that the invention is not limited to this specific use but is of general application.

Further objects are to provide a very simple and easily constructed mechanical movement, in which the parts may be readily produced and assembled, and in which the device is substantially fool-proof and of long life.

An embodiment of the invention is shown in the accompanying drawings, in which:

Figure 1 is a side elevation, partly in section, of the device.

Figure 2 is a plan view of the structure shown in Figure 1.

Figures 3 and 4 are sectional views on the lines 3—3 and 4—4 of Figure 1.

Referring to the drawings it will be seen that a main frame 1 has been illustrated as provided with a base portion 2 and an upper portion 3. This main frame member has a side frame member 4 which extends inwardly, as indicated at 5 in Figures 1 and 2.

It is to be distinctly understood that other types of frame members may be used, and, if desired, in the particular use disclosed in this case, the frame member may constitute a part of the motor casing itself.

The members 1 and 5 carry bearings for the power shaft 6 which is journaled therein, as illustrated in Figure 1. A vertical shaft, or transverse shaft, 7 extends across the end of the power shaft and is journaled in the members 2 and 3, preferably suitable bearings being provided for the shaft, as illustrated. The transverse shaft 7 rigidly carries an upper beveled gear 8 and a lower bevel gear 9. A reciprocatory member 10, which may be of any suitable type, such for instance as the handle shown, is also rigidly locked to the transverse shaft 7. For example, it may be locked to the gear 9 and the gear also locked to the shaft 7 by the set screws shown.

The power shaft 6 is provided with a relatively large beveled gear 11 and a relatively smaller beveled gear 12 which mesh with the large beveled gear 9 and the small bevel gear 8. These bevel gears 11 and 12 are loosely mounted upon the power shaft 6. They are connected thereto by means of any suitable type of overrunning clutch, whether of the friction variety or of the pawl type, the latter being shown for the purpose of illustration, although it is to be distinctly understood that the invention is not limited to this type of clutch.

Referring to Figures 1 and 4, it will be seen that the shaft 6 rigidly carries a ratchet member 13 which cooperates with a spring pressed pawl carried by the beveled gear 11. Further, from reference to Figures 1 and 3, it will be seen that the shaft 6 also rigidly carries a ratchet member 15 which similarly cooperates with the spring-pressed pawl 16 carried by the beveled gear 12. It is to be noted that these clutches overrun in the same direction and that the gears 11 and 12 are rotated alternately in opposite directions. By this means one of the gears will always be in operative relation to the shaft 6 so that the shaft will be turned in the same direction alternately by gears 11 and 12. The reverse direction of rotation of the gears 11 and 12 is attained by having the gears 9 and 8 engage them at opposite sides.

The effect of this construction is that at each motion of the oscillatory member 10 the shaft 6 is turned in a predetermined direction so that this shaft may transmit uni-directional motion to any desired mechanism.

It will be seen further that the device is of extremely simple and of reliable construction and may be very cheaply and readily produced and assembled. Further it is to be noted that the device has a wide applicability and it is therefore to be distinctly understood that the description and drawings are intended in an illustrative capacity and not in a limiting capacity.

While I have shown and described clutches either of the ratchet or friction type arranged to convert reciprocative motion in a clockwise direction with reference to the driven shaft 6, obviously I may reverse the clutches shown in Figures 3 and 4 to cause the shaft 6 to revolve in the opposite or anticlockwise direction.

I claim:—

A mechanical movement comprising a supporting frame, a power shaft journaled therein, a transverse shaft journaled in said frame and extending across the end of said power shaft, an oscillatory member rigidly secured to said transverse shaft, a pair of bevel gears rigidly secured to said transverse shaft and located upon opposite sides of said power shaft, a pair of beveled gears loosely mounted upon said power shaft and meshing with said first mentioned bevel gears, and overrunning clutches operatively connecting said last mentioned bevel gears with said power shaft, said overrunning clutches and said gears being so associated that rocking movement of said oscillatory member in either direction will drive said power shaft in the same direction.

In testimony that I claim the foregoing I have hereunto set my hand at Milwaukee, in the county of Milwaukee and State of Wisconsin.

AAGE RASMUSSEN.